US012704635B2

(12) United States Patent
Frederiksen et al.

(10) Patent No.: US 12,704,635 B2
(45) Date of Patent: Aug. 11, 2026

(54) LIDAR SYSTEM HAVING A RAY OPTICS DIAGNOSIS

(71) Applicant: Robert Bosch GmbH, Stuttgart (DE)

(72) Inventors: Annette Frederiksen, Renningen (DE); Nico Heussner, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1156 days.

(21) Appl. No.: 17/649,465

(22) Filed: Jan. 31, 2022

(65) Prior Publication Data

US 2022/0244397 A1 Aug. 4, 2022

(30) Foreign Application Priority Data

Feb. 4, 2021 (DE) ..................... 10 2021 201 004.0

(51) Int. Cl.
*G01S 17/931* (2020.01)
*G01S 7/481* (2006.01)
*G01S 7/497* (2006.01)

(52) U.S. Cl.
CPC .......... *G01S 17/931* (2020.01); *G01S 7/4813* (2013.01); *G01S 7/497* (2013.01)

(58) Field of Classification Search
CPC ...... G01S 17/931; G01S 7/4813; G01S 7/497; G01S 7/4817; G01S 7/4802; G01S 7/481; G01S 17/88; G01S 17/89; G01S 17/894
See application file for complete search history.

(56) References Cited

U.S. PATENT DOCUMENTS 5,506,702 A * 4/1996 Simpson .................. G02B 5/32 250/203.1
10,061,020 B2 * 8/2018 Slobodyanyuk ...... G01S 17/931
10,509,112 B1 * 12/2019 Pan .......................... G01S 7/484
10,545,240 B2 * 1/2020 Campbell ............... G01S 17/89
11,561,288 B2 * 1/2023 Kawakami .............. G01S 7/497
11,635,614 B2 * 4/2023 Takashima ............ G01S 7/4817 356/4.01

(Continued)

FOREIGN PATENT DOCUMENTS

CA 3158053 A1 * 6/2021 ............. A61B 6/027
CA 3165421 A1 * 9/2021 ............. G01S 17/10

(Continued)

OTHER PUBLICATIONS

Stuart A. Young, "Lidar system optical alignment and its verification", May 1987.*

*Primary Examiner* — Assres H Woldemaryam
(74) *Attorney, Agent, or Firm* — NORTON ROSE FULBRIGHT US LLP

(57) ABSTRACT

A LiDAR system including an emitter and a detector, as well as a ray optics that is at least developed to deflect a ray of light emitted by the emitter for scanning an environment in a normal operation. The LiDAR system has a diagnosis system situated in the LiDAR system. In a diagnosis operation, the ray optics is configured to deflect the ray of light from the emitter onto the diagnosis system and to guide the light reflected by the diagnosis system to the detector in order to detect a diagnosis light signal. A control unit of the LiDAR system is developed to detect an error in the ray optics based on a difference between an expected diagnosis light signal and the actually received diagnosis light signal.

15 Claims, 1 Drawing Sheet

(56) References Cited

U.S. PATENT DOCUMENTS

| | | | | |
|---|---|---|---|---|
| 11,740,330 | B2 * | 8/2023 | Christmas | G01S 7/4817 356/5.01 |
| 2013/0182239 | A1 * | 7/2013 | Kaiser | G01S 17/89 356/4.01 |
| 2020/0284883 | A1 * | 9/2020 | Ferreira | G01S 7/4815 |
| 2021/0055395 | A1 * | 2/2021 | Mano | B60Q 1/0023 |
| 2021/0372923 | A1 * | 12/2021 | Son | G01S 17/931 |
| 2021/0389464 | A1 * | 12/2021 | Ramsteiner | G01S 17/89 |

FOREIGN PATENT DOCUMENTS

| | | | |
|---|---|---|---|
| CN | 101569959 | A | 11/2009 |
| CN | 111065900 | A | 4/2020 |
| KR | 20000001573 | U | 1/2000 |
| WO | 2019086601 | A1 | 5/2019 |

* cited by examiner

LIDAR SYSTEM HAVING A RAY OPTICS DIAGNOSIS

CROSS REFERENCE

The present application claims the benefit under 35 U.S.C. § 119 of German Patent Application No. DE 10 2021 201 004.0 filed on Feb. 4, 2021, which is expressly incorporated herein by reference in its entirety.

FIELD

The present invention relates to a LIDAR system including an emitter and a detector, a ray optics, which is designed at least to deflect a ray of light emitted by the emitter for scanning an environment in a normal operation.

BACKGROUND INFORMATION

In the coming years, the use of highly and fully automated vehicles (levels 3-5) on public roads will become ever more prevalent. Conventional concepts of automated vehicles require a combination of different perception sensors, e.g., cameras, radar and LiDAR (Light Detection and Ranging). The latter are laser scanners which emit one or multiple short pulse(s) of laser light and acquire the light reflected by an object. LiDAR sensors then calculate the distance to the object based on the measured propagation time. Lasers in the infrared range are normally used for this purpose in an effort to prevent persons in the environment from being exposed to glare, for example.

An emitter operating in the infrared range in LiDAR systems must likewise ensure the eye safety while in operation. Apart from the emitted power and wavelength, the ray profile or ray parameters are also taken into account. These are checked in the final control after the production, but it is also useful to be able to check these parameters while the LiDAR system is in operation so that a change can be determined in this way. For example, a lens or a mirror in the optical transmission path may loosen, shift or detach and thus affect the ray profile to a significant extent with the result that the system no longer meets the laser classification following the production. This could have a negative effect on eye safety in the vicinity of the LiDAR system and worsen the measuring accuracy of the system. Not every fault of the ray optics must immediately lead to a complete failure of the system (i.e., especially in cases where no reflected light reaches the detector any longer) and is also not always readily detectable in conventional LiDAR systems during the operation. In a partially or completely automated vehicle, such a (partial) failure of the LiDAR system is particularly safety-relevant, and an error of this kind in the ray optics should be detectable as quickly as possible.

SUMMARY

According to the present invention, a LiDAR system of the type mentioned in the introduction is provided. In accordance with an example embodiment of the present invention, the LiDAR system includes a diagnosis system disposed in the LiDAR system, and the ray optics is developed to deflect the ray of light from the emitter onto the diagnosis system in a diagnosis operation, and to guide the light reflected by the diagnosis system to the detector in order to detect a diagnosis light signal, and a control unit of the LiDAR system is developed to detect an error in the ray optics based on a difference between an expected diagnosis light signal and the actually received diagnosis light signal.

The present invention may make it possible to utilize the dead time of a LiDAR system, during which no measurement is performed, as a diagnosis operation so that the ray optics of the system can be checked. This approach may be used both in rotating and scanning LiDAR systems. The diagnosis system of the LiDAR system is irradiated via the ray optics during the dead time and the back-scattered or reflected light is acquired by a detector which is provided anyway. The diagnosis system is preferably situated within the LiDAR system, in particular inside a housing of the LiDAR system. A wall of the housing may include an at least partially transparent window through which the light is emitted to the environment in a normal operation. The diagnosis system may then be placed on another wall of the housing (e.g., a rear wall disposed opposite the window).

Here, the term 'ray optics' should be understood to denote that the ray optics may include a deflection unit and also a ray-forming unit, for example. The deflection unit may include a rotatable mirror, a rotation unit, a micromirror, an optical phase array, etc. for deflecting the emitted ray of light to the environment and for guiding back the reflected ray of light. The ray-forming unit can encompass optical elements such as lenses, objectives or prisms, for instance, which may be allocated to the emitter and/or the detector.

Many LiDAR system do not perform 360° scanning of the environment but are configured to scan only a limited angular range (e.g., in front, behind or next to a vehicle). For purely practical reasons, the deflection unit is often developed so that a rotating mirror, for example, still performs a 360° rotation and that the emitted ray of light is still deflected (nearly) the full 360° in a rotation period of the rotating mirror. In this context, the 'dead time' of the LiDAR system then denotes the periodically recurring time segment in which the emitted light ray does not scan the environment of the LiDAR system but scans a housing wall of the LiDAR system, for example. Thus, the 'dead time' is a geometrical dead time in this case and not a sensor dead time that may result from the detection characteristics of the sensor semiconductor, for instance.

For example, a difference between an expected diagnosis light signal and the actually received diagnosis light signal may consist of a missed reception of the diagnosis signal because the diagnosis light signal fails to return to the detector. However, a deviation such as from a form and/or position of a diagnosis object to be imaged in the detector plane (e.g., a geometrical form) may also be detected (for instance by tilting of a lens or a mirror). In the same way, a deviation in the light intensity of the diagnosis light signal may be detected (e.g., caused by soiling or damage of optical elements in the ray path).

The term 'light' in this application denotes that it may include both infrared light and visible light.

The control unit may be configured so that it emits an error signal when it detects an error in the ray optics and/or reduces the output of the emitter (eye safety must be ensured in an incorrect ray deflection) and/or shuts down the LiDAR system. This may be implemented as a function of the severity of the error, that is to say, merely the output of an error report in case of minor deviations.

In accordance with an example embodiment of the present invention, the diagnosis system preferably includes at least one diffractive optical diagnosis element and/or one holographic optical diagnosis element. This makes it easier to generate a well-defined diagnosis pattern in the detector plane. In contrast to a simple geometrical pattern in the diagnosis system, such diagnosis elements facilitate an imaging in the detector plane despite the relatively small distance (notwithstanding the fact that the ray optics is actually set up to image objects situated at a considerably greater distance) and a reduction of the high light intensity in the reflected light in order to avoid a saturation of the detector. However, the light reflected by the diagnosis element is still able to generate a "simple" geometrical pattern in the detector plane such as a circle, a rectangle or square.

In accordance with an example embodiment of the present invention, the diagnosis system preferably includes at least one surface hologram and/or at least one volume hologram. With the aid of such diagnosis elements, random angle deflections are achievable (because the angle of incidence=angle of reflection restriction does not exist). This allows for a particularly space-saving positioning which may be used in rotating systems featuring a coaxial placement of the transmit and receive paths, for instance.

In one example embodiment of the present invention, the diagnosis system is situated within a housing of the LiDAR system, preferably on an inner wall of the housing. The diagnosis system is preferably situated on an inner wall of the housing disposed opposite a window of the housing. As an alternative, however, the diagnosis device may also be placed on an inner side wall of the housing, but the diagnosis system may also be placed on another element situated in the housing (e.g., an electronic circuit board, a sub-housing, etc.).

It is preferred if the ray optics includes at least one rotatable mirror, which is developed to guide a ray of light emitted by the emitter through a window out of a housing of the LiDAR system in a normal operation and to guide it to the diagnosis system in a diagnosis operation.

Alternative example embodiments of the present invention in which the deflection of the ray of light is achieved in a different manner than through a rotatable mirror are also possible, however. For instance, the present invention may also be used in LiDAR systems in which the ray optics including the emitter and detector rotates relative to the housing (or is swiveled back and forth). In this case, the diagnosis system could be situated above or below the (e.g., circumferential) window or be situated under a certain rotational angle in the housing (e.g., in a non-transparent interruption of a circumferential window).

In one example embodiment of the present invention, the diagnosis system has at least one pattern with known dimensions, preferably a circle, a square or a rectangle. The control unit is preferably configured to infer an error in the ray optics from the magnitude of the deviations of the form measured by the detector from the expected form, and to output an error message. In this context, a threshold value may be predefined for the deviation, below which normal deviations are assumed such as those due to vibrations and a temperature-dependent material expansion.

In one example embodiment of the present invention, the diagnosis system includes at least one pattern that, at a predefined setting of the ray optics, produces an imaged pattern having known dimensions in the plane of the detectors, preferably a circle, a square or a rectangle. This pattern may be developed so that, in the ideal case (if no error exists in the ray optics), it produces a predefined diagnosis pattern in the plane of the detector. This does not necessarily mean that the diagnosis system also includes a circle, a square or a rectangle, e.g., if the diagnosis system is embodied as a holographic or diffractive element, so that the geometrical form is created only by the imaging. In case of an error in the ray optics, the imaged pattern then no longer assumes the predefined form in the detector plane, which then makes it possible to diagnose an error.

The diagnosis system preferably has a reflectance factor of maximally 20%, preferably of maximally 10%, for the light emitted by the emitter. As usual, the reflectance factor is defined as the ratio of the reflected power to the incident power. If the emitter is an (infrared) laser, then this means a reflectance factor at the wavelength of the (infrared) laser. This solution makes it possible to use the emitter in the diagnosis operation at the same setting as in a normal operation (not every emitter readily allows for an emission at a reduced power) without the back-reflected diagnosis light saturating the detector and making the diagnosis measurement harder or impossible. Modern LiDAR sensors often use single-photon avalanche diodes (SPAD), which are sensitive to an excessive light intensity of the signal to be detected.

As an alternative, the emitter may be configured to emit a ray intensity in a diagnosis operation that is reduced in comparison with a normal operation.

In one example embodiment of the present invention, the diagnosis system includes at least one holographic optical diagnosis element, and the reflectance factor of the holographic optical diagnosis element is reduced to maximally 20%, preferably to maximally 10%, by the selection of a refractive index modulation and/or the thickness of a holographic layer. In this embodiment, the development of the refraction characteristics or the layer thickness of the holographic optical diagnosis element reduces the reflectance factor to such a degree that the detector will not be saturated by the reflected diagnosis light.

According to an example embodiment of the present invention, a control unit for a vehicle is also provided, which includes a LiDAR system as described in one of the above embodiments. The control unit processes sensor signals, among others, and outputs control signals as a function thereof. The control unit may particularly be a control unit for self-driving vehicles.

Advantageous further refinements and embodiments of the present invention are disclosed herein.

BRIEF DESCRIPTION OF THE DRAWINGS

Exemplary embodiments of the present invention will be described in greater detail based on the figures and the following description.

DETAILED DESCRIPTION OF EXAMPLE EMBODIMENTS

Figure 1:
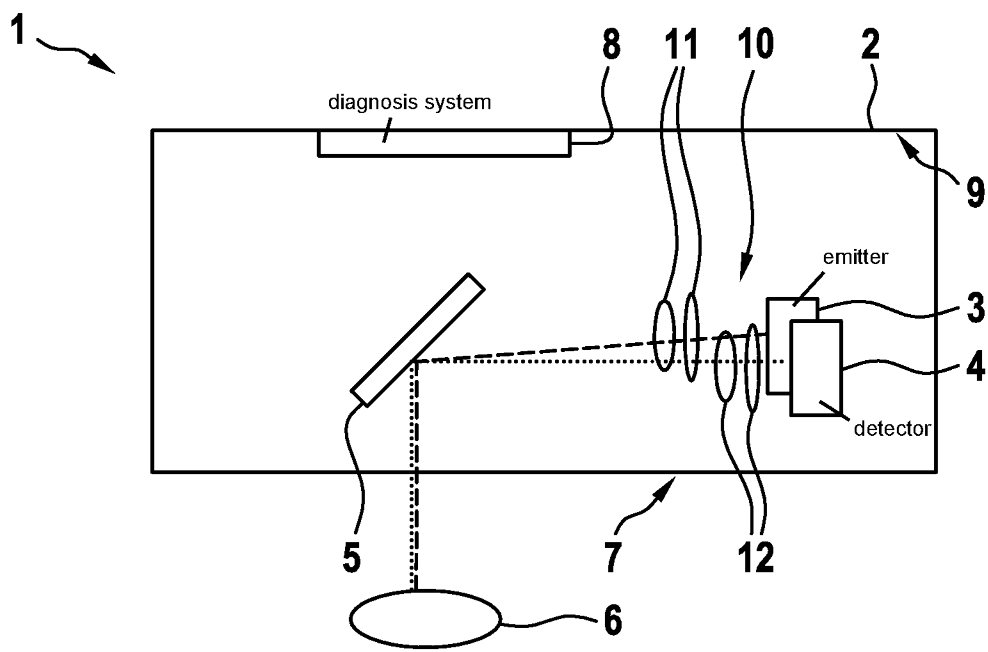
FIG. 1 shows an example embodiment of a LiDAR system according to the present invention in a normal operation.
Figure 2:
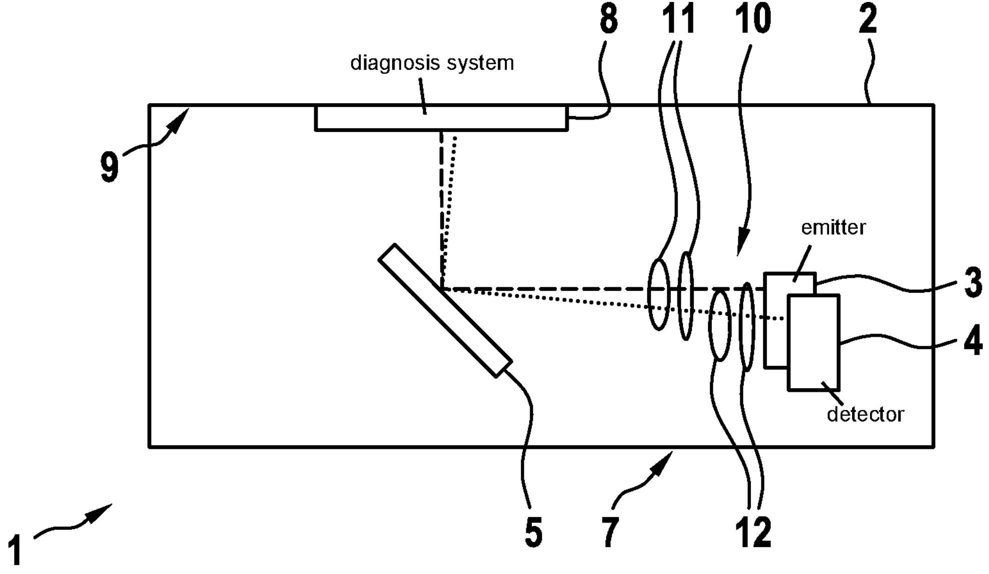
FIG. 2 shows the embodiment of FIG. 1 in a diagnosis operation.

FIGS. 1 and 2 show an embodiment of a LiDAR system 1 according to the present invention, which includes a housing 2 in which an emitter 3 and a detector 4 are situated. A ray optics includes a deflection unit 5 and a ray-forming unit 10. Here, deflection unit 5 is shown in simplified form only by a rotating mirror but it could also include other optical elements such as static mirrors, prisms, optical phase arrays and others.

Deflection unit 5 need not necessarily include a rotating mirror but detector 4 and emitter 3 may rotate themselves, or it is possible to use an optical phase array, for instance, for the ray deflection.

In general, the ray optics includes at least a deflection unit 5, which is developed to deflect the emitted ray of light from emitter 3 to the environment and the reflected ray of light from the environment to detector 4, and it preferably has a ray-forming unit 10, which is developed to form the ray of light from emitter 3 and/or the ray of light to detector 4.

For instance, ray-forming unit 10 includes lenses 11, which are allocated to emitter 3, and lenses 12, which are allocated to detector 4. The ray optics (in particular deflection unit 5 and/or ray-forming unit 10) may basically include one or more optical element(s), e.g., static mirrors, rotating mirrors, lenses, prisms, holograms or optical phase arrays.

The solution according to the present invention also makes it possible to detect small errors in the ray optics and especially in deflection unit 5 or ray-forming unit 10 (misaligned rotating mirror, loosened lenses 11, 12, etc.) in the diagnosis operation, without requiring significant changes in the structure of the LiDAR system for this purpose.

FIG. 1 shows a normal operation during which the ray optics deflects a ray of light emitted by emitter 3 (dashed line) through a window 7 of housing 2 in order to scan an environment. The ray of light is reflected at an environment object 6, among others, and reaches detector 4 as reflected ray of light (dotted line), the distance being calculated based on the propagation time.

In FIG. 2, the ray optics in a diagnosis operation guides a diagnosis ray of light from emitter 3 to a diagnosis system 8 from where a reflected diagnosis ray of light reaches detector 4. Diagnosis system 8 is situated on a rear wall 9 of housing 2. A control unit of LiDAR system 1 (not shown) is designed to detect an error in the ray optics (e.g., a misaligned/detached mirror or lens) based on a difference between an expected diagnosis light signal and the actually received diagnosis light signal.

Although the present invention was illustrated and described in detail by preferred exemplary embodiments, the present invention is not restricted by the disclosed examples and one skilled in the art may derive other variants from it without departing from the protection scope of the present invention, in view of the disclosure herein.

What is claimed is:

1. A LiDAR system, comprising:

an emitter;

a detector;

a ray optics, which at least is configured to deflect a ray of light emitted by the emitter for scanning an environment in a normal operation;

a diagnosis system situated in the LiDAR system, and including at least one optical element configured to reflect or diffract the ray of light, wherein, in a diagnosis operation, the ray optics is configured to deflect the ray of light from the emitter onto the diagnosis system and to guide the light reflected by the diagnosis system to the detector to detect a diagnosis light signal; and a control unit configured to detect an error in the ray optics based on a difference between an expected diagnosis light signal and the received diagnosis light signal, wherein the diagnosis operation is performed during a dead time of the LiDAR system, the dead time being a time period in which the ray optics does not scan the environment.

2. The LiDAR system as recited in claim 1, wherein the diagnosis system includes at least one diffractive optical diagnosis element and/or at least one holographic optical diagnosis element.

3. The LiDAR system as recited in claim 2, wherein the diagnosis system includes at least one surface hologram and/or at least one volume hologram.

4. The LiDAR system as recited in claim 1, wherein the diagnosis system is situated within a housing of the LiDAR system.

5. The LiDAR system as recited in claim 4, wherein the diagnosis system is situated on an inner wall of the housing.

6. The LiDAR system as recited in claim 1, wherein the ray optics includes at least one rotatable mirror, which is configured to guide the ray of light emitted by the emitter through a window out of a housing of the LiDAR system in the normal operation, and to guide the ray of light to the diagnosis system in the diagnosis operation.

7. The LiDAR system as recited in claim 1, wherein the diagnosis system has at least one pattern with known dimensions.

8. The LiDAR system as recited in claim 7, wherein the at least one pattern is a circle or a square or a rectangle.

9. The LiDAR system as recited in claim 1, wherein the diagnosis system includes at least one pattern that, at a predefined setting of the ray optics, produces an imaged pattern having known dimensions in a plane of the detector.

10. The LiDAR system as recited in claim 9, wherein the imaged pattern is a circle or a square or a rectangle.

11. The LiDAR system as recited in claim 1, wherein the diagnosis system has a reflectance factor of maximally 20% for light emitted by the emitter.

12. The LiDAR system as recited in claim 11, wherein the reflectance factor is maximally 10%.

13. The LiDAR system as recited in claim 11, wherein the diagnosis system includes at least one holographic optical diagnosis element, and the reflectance factor of the holographic optical diagnosis element is reduced to maximally 20% by selection of a refractive index modulation and/or a thickness of a holographic layer.

14. The LiDAR system as recited in claim 12, wherein the diagnosis system includes at least one holographic optical diagnosis element, and the reflectance factor of the holographic optical diagnosis element is reduced to maximally 10% by selection of a refractive index modulation and/or a thickness of a holographic layer.

15. A control unit for a vehicle including a LiDAR system, the LiDAR system including an emitter, a detector, a ray optics, which at least is configured to deflect a ray of light emitted by the emitter for scanning an environment in a normal operation, and a diagnosis system situated in the LiDAR system, wherein, in a diagnosis operation, the ray optics is configured to deflect the ray of light from the emitter onto the diagnosis system and to guide the light reflected by the diagnosis system to the detector to detect a diagnosis light signal, and wherein the control unit is configured to detect an error in the ray optics based on a difference between an expected diagnosis light signal and the received diagnosis light signal, wherein the diagnosis operation is performed during a dead time of the LiDAR system, the dead time being a time period in which the ray optics does not scan the environment.

* * * * *